2,797,196

OIL BASE DRILLING FLUID

Thomas H. Dunn and James L. Lummus, Tulsa, Okla., assignors to Pan American Petroleum Corporation, a corporation of Delaware No Drawing. Application August 3, 1953, Serial No. 372,197

16 Claims. (Cl. 252—8.5)

This invention pertains to fluids for use in drilling oil and gas wells. More particularly, this invention relates to an improved drilling fluid of the non-aqueous type; i. e., an oil-base drilling fluid. This application is a continuation-in-part of our abandoned application Serial Number 144,856 filed February 17, 1950.

In the drilling of oil and gas wells the desirability of using a drilling fluid which produces an oily filtrate has been recognized for some time. An oily filtrate, as is well known, does not hinder oil flow by producing what is often referred to as a water block in the flow capillaries of an oil or gas producing formation. A number of oil-base drilling fluids have been proposed and marketed. These fluids, however, have not been widely accepted due, genenrally, to their high cost and their undesirable handling characteristics. More specifically, these oil-base drilling fluids, which contain asphalts to plaster the walls of the well and inhibit loss of the drilling fluid to the permeable formations surrounding the well, are objectionable, disagreeable, and dirty for the drilling crews to handle. Also, all of the ingredients must be specially prepared and shipped to the drilling location. Refined oils are generally required. Thus, the initial cost of an oil-base drilling fluid has, disregarding the personnel element, substantially limited its use.

Accordingly, it is an object of this invention to provide an improved oil-base drilling fluid. Another object of this invention is to provide an oil-base drilling fluid which can be economically compounded. A further object of this invention is to provide an improved composition and method of manufacturing a modified clay admixture which can be prepared in a central location and shipped in bulk, or in inexpensive containers, to a drilling site and there be dissolved, or dispersed, in readily available oily liquid to produce an oil-base drilling fluid. A still more specific object of this invention is to provide an improved composition of matter particularly adaptable to drilling oil and gas wells—consisting of an oleaginous base and a modified clay adapted to plaster the walls of the well and to add viscosity to the oleaginous base so that it will remove cuttings from the well—and, in addition, provide a gel which will suspend cuttings in a static system. These and other objects of this invention will be apparent from the following description.

The objects of this invention are accomplished, in general, by employing non-anionic surface active agents (as hereinafter defined) to disperse finely divided clay particles in an oily base fluid. Such agents might also be called clay-compatible agents. As used in this description and the appended claims "surface active agents" means, in general, solutes which, even when present in very low concentrations, have the property of altering the surface energy of their solvents to an extreme degree. More specifically, surface active agents, as used herein, shall mean and include any agent (liquid or solid) which, when added in a concentration of 0.025% (based on the total volume of oil and water) to an immiscible, non-emulsified system containing 50 parts pure water and 50 parts USP mineral oil,[1] will reduce the interfacial tension in dynes per centimeter by at least 20% of the initial interfacial tension between the oil and water. The initial interfacial tension between the oil and water shall not be less than 48 dynes per centimeter. In this test a DuNuoy tensionmeter, employing a platinum ring in which the diameter of the ring in relation to the gage of the wire is large, is used to measure the interfacial tension, employing the standard ring procedure, such as that described by Schwarts and Perry at page 268 of the book entitled "Surface Active Agents," published in 1949 by Interscience Publishers, Inc.

Surface active agents are divided into ionic and non-ionic classes. The ionic class of agents has two main divisions. If the elongated, low-affinity portion of the molecule is included in the anion in aqueous solution, the substance is called anion active, or simply anionic. Sodium stearate is a typical anionic surface active agent since it ionizes in solution to form $Na^+$ and the long-chain stearate anion, $C_{17}H_{35}COO^-$, which we may consider responsible for the surface activity. The cation active or cationic surface active agents form a cation containing the elongated low-affinity portion of the molecule. Cetylpyridinium sulfate is an example of this class. It comprises a complex polar cation associated with an inorganic anion. The anionic surface active agents are sensitive to the presence of other ions and, therefore, are ineffective in many waters which contain electrolytes. It has been discovered that clay particles are anionic in character and that anionic surface active agents will not disperse finely divided clay particles in an oily liquid.

Various tests may be made to determine whether a surface active agent is anionic, cationic, or non-ionic. The preferred procedure is as follows:

I. Test for anionic surface active agents
  A. If surface active agent is:
    1. Oil soluble, it is dissolved in dioxane (1 part to 25 parts of dioxane).
    2. Water soluble, it is dissolved in distilled water (1 part to 25 parts of distilled water).
  B. If surface agent is:
    1. Oil soluble, prepare a dioxane solution of the dye pinacyanol (1 part dye per 100 parts of dioxane).
    2. Water soluble, prepare a water solution of the pinacyanol (1 part pinacyanol to 100 parts of distilled water).
  C. If the surface active agent is:
    1. Oil soluble, prepare a blank solution by adding 5 cc. of the solution B 1 to 10 cc. of dioxane.
    2. Water soluble, prepare a blank solution by adding 5 cc. of solution B 2 to 10 cc. of water. This solution will be green in color.
  D. If surface active agent is:
    1. Oil soluble, add 5 cc. of solution B 1 to 10 cc. of the solution of A 1.
    2. Water soluble, add 5 cc. of solution B 2 to 10 cc. of solution A 2.
  E. If surface active agent being tested is anionic, the solution prepared in D will be relatively blue in color in comparison to the blank solution prepared in C.

---

[1] A colorless, transparent, oily liquid, obtained from petroleum, free, or nearly free, from fluorescence. It is odorless and tasteless when cold. Mineral oil is insoluble in water and alcohol. It is miscible with most fixed oils, but not castor oil, and is soluble in volatile oils. The specific gravity of mineral oil is not less than 0.860 and not more than 0.905. The kinematic viscosity of mineral oil is not less than 38.1 centistokes at 37.8°.

II. Test for non-anionic surface active agents
- A. If the surface active agent being tested under the above test for anionic surface active agents is non-anionic, the solution prepared in D will be the same color as the blank solution prepared in C.

III. Test for cationic surface active agents
- A. If surface active agent is:
  1. Oil soluble, it is dissolved in dioxane (1 part to 25 parts of dioxane).
  2. Water soluble, it is dissolved in distilled water (1 part to 25 parts of distilled water).
- B. If the surface active agent is:
  1. Oil soluble, prepare a dioxane solution of dye dianisidine tetrazotized and coupled twice (alkaline) with SS acid which is 1-amino 2-, 4-disulfonic 8-hydroxynaphthalene by dissolving 1 part of the dye per 100 parts of dioxane.
  2. Water soluble, prepare a water solution of the dye (1 part dye per 100 parts of distilled water).
- C. If the surface active agent is:
  1. Oil soluble, prepare a blank solution by adding 5 cc. of the solution B 1 to 10 cc. of dioxane.
  2. Water soluble, prepare a blank solution by adding 5 cc. of solution B 2 to 10 cc. of water. This solution will be cobalt blue in color.
- D. If surface active agent is:
  1. Oil soluble, add 5 cc. of solution B 1 to 10 cc. of the solution of A 1.
  2. Water soluble, add 5 cc. of solution B 2 to 10 cc. of solution of A 2.
- E. If surface active agent being tested is cationic, the solution prepared in D will be relatively purple in color in comparison to the blank solution prepared in C.

IV. Test for non-ionic surface active agents
- A. If the surface active agent being tested as above for anionic and cationic surface active agents does not produce a change in color, it is a non-ionic surface active agent.

Typical cationic surface active agents may be divided, generally, into four classes: (1) amine salts—examples of this class are Amine ES, manufactured by Carbide & Carbon Chemical Corporation; Catiosan, manufactured by Onyx Oil & Chemical Company; Alkaterges, manufactured by the Commercial Solvents Corp.; Alromine, R and G series, manufactured by Alrose Chemical Company; Negamine 142A (hydroxy amino long chain fatty acid ester); and Intracol R, manufactured by Synthetic Chemicals, Inc., (2) quaternary ammonium salts—examples of this class are Alrosep MB (tridecyl benzyl hydroxy ethyl imidazolinium chloride), manufactured by Alrose Chemical Company; Arquads, for example, Arquad 16 (hexadecyl trimethyl ammonium chloride), manufactured by Armour & Co.; B. T. C. (alkyl dimethyl benzyl ammonium chloride), manufactured by Onyx Oil and Chemical Corporation; and Triton K–60 (stearyl dimethyl benzyl ammonium chloride), manufactured by Rohm & Haas Co; (3) other nitrogenous bases such as Amine 220, manufactured by Carbide & Carbon Chemical Corporation; and (4) non-nitrogenous bases (classes 3 and 4 are less common and are not used as extensively as the above amine salts and quaternary ammonium compounds). All of the examples listed have been tested and found to modify clay and produce a suitable oil-base drilling fluid.

Surface active agents which fall under the above definition for such agents may not produce a color change in either of the above tests for anionic and cationic surface active agents. Such surface active agents are classified as non-ionic surface active agents. This class of agents depends chiefly upon hydroxyl groups and ether linkages to create the characteristic surface active portion of the molecule. Either they do not ionize, or they ionize to such a small degree that they, like the cationic surface active agents, are compatible with the anionic clay particles and tend to wet them. That is, this class of surface active agents is not repellant or incompatible to clay. Non-ionic surface active agents have been found effective in dispersing finely divided clay particles in oily liquids. Accordingly, non-ionic surface active agents may be classed with cationic surface active agents as non-anionic, or clay-compatible, surface active agents.

Non-ionic surface active agents, like cationic surface active agents, may be divided into a number of typical classifications. First, they may be divided into water-soluble and oil-soluble surface active agents. The most common is the water-soluble non-ionic surface active agent—i. e., those surface active agents which have a high ratio of alkene oxide groups which are soluble or dispersible in water, and which, according to the above definition, have the property of altering the surface energy of their solvents to an extreme degree, even when present in low concentrations. The oil-soluble, non-ionic surface active agents also have the properties of surface active agents, as above defined, but do not have sufficient hydrophilic character to be fully soluble in water. Water-insoluble compounds are, therefore, sometimes considered as oil-soluble emulsifying agents. Examples of both of these classes, which have been tested and found to modify clay according to our invention, are: the Steroxes, for example, Sterox CD (tall oil ester having 12 ethylene oxide mols per mol of tall oil), manufactured by Monsanto Chemical Company; Igepals, for example, Igepal CA Extra (a $C_8$ or $C_9$ [alkyl] phenol polyoxyethylene ester), manufactured by General Dyestuff Corp.; Nonic 218 (tertiary dodecylthioether having about 12 mols of ethylene oxide per mol of thioether), manufactured by Sharples Chemical Co.; Neutronyx, manufactured by Onyx Oil & Chemical Co.; Lipals, for example, Lipal 40 (nonaethylene glycol mono-oleate), manufactured by E. F. Drew & Co.; Victawets 12 and 14 (phosphoric esters of higher alcohols, e. g. capryl and octyl alcohol; and Victamuls, manufactured by Victor Chemical Works; Nopalcols, manufactured by Nopco Chemical Co.; Miragenes, manufactured by Miranol Chemical Co.; and Renex (tall oil ester having 16 ethylene oxide mols per mol of tall oil), manufactured by Atlas Powder Co.; Intrals, manufactured by Synthetic Chem's., Inc.; Pentamulls, for example, Pentamull 126 (mono-ester of oleic acid and pentaerythritol), manufactured by Heyden Chemical Co.; Spans, for example, Span 80 (sorbitan mono-oleate), manufactured by Atlas Powder Company; Kontol 118, manufactured by Tretolite Company; and Emulphor AG (polyglycol ester of fatty acid), manufactured by General Deystuff Corp. Many of the silicones are surface active agents under our above definition. They tend to be typically non-ionic in that they do not give a change in color in the above-described tests for anionic and cationic surface active agents. Typical silicone non-ionic surface active agents are Dow Corning 200 Fluids, manufactured by Dow Corning, Inc., and Dri-Film, manufactured by General Electric.

Any finely divided naturally colloidal clay may be used in formulating the oil-base drilling fluid herein described and claimed. We have tested each of the four recognized chemical classes of clays—namely, the montmorillic group, the illite group, the kaolinite group, the attapulgite group, and various combinations thereof. Any of these classes of clays may be dispersed in an oily liquid by the hereinafter-described procedure, using the non-anionic or clay-compatible surface active agents; but the montmorillonite group, particularly the Wyoming type bentonite, due partially to its general availability, has been found quite satisfactory.

In preparing oil-base drilling fluid according to this invention, the above-described clays may be dispersed in any oily liquid, such as vegetable oil, animal oil, fish oil, or a mineral oil. Mineral oils, and, particularly, mineral oils having substantially the same characteristics as the oil in the formations being drilled, are preferred. That is, crude oils from the same or similar fields have been found quite satisfactory as a base material for a drilling fluid to be used at a particular location. However, other oils—including refined oils, such as kerosene, diesel oil, fuel oil, lubricating oil, or partially refined oils, such as topped crude oil (crude oils in which the lighter or more volatile constituents have been removed)—and synthetic lubricants, such as polymerized olefins and various high-molecular-weight esters (alone or in various combinations), may be used to advantage as the base liquid in our oil-base drilling fluid. The clay can be dispersed in the base fluid by first wetting the clay with the non-anionic surface active agent, or dispersing it on the clay in a thin film. The clay is wetted by merely stirring, or agitating, the clay and the surface active agent together. This wetting may be aided, in some cases, by dissolving the non-anionic surface active agent in a suitable solvent, mixing the clay and surface active agent solvent together, and then evaporating off the solvent. Preferably, however, the clay is mixed with the surface active agent by using an oily pugging agent in the ratio of between about 1.5 to 7 parts of clay, or more, per part of surface active agent by weight. The surface active agent may first be dissolved or dispersed in an oily pugging agent, or the clay, pugging agent, and non-anionic surface active agent may all be mixed simultaneously. The ratio of oily pugging agent to surface active agent is not critical; but we have found that desirable results are obtained by incorporating from about 0.5 to about 3 parts of pugging agent to 1 part of surface active agent, preferably between about 1.2 and about 1.7 parts of pugging agent per part of surface active agent by weight. This pugging agent is not essential to the dispersion of clay in the base liquid; but we have found that, as a manufacturing process, the use of pugging agents is desirable. The pugging agent may be any oily liquid of the classes of mineral oils, vegetable oils, fish or animal oils; but, preferably, it is of the class of the base oil from which the oil-base drilling fluid is to be prepared.

In the preferred process the modified, or oil dispersible, clay is first prepared by placing the clay in the mixer and adding the pugging agent slowly to clay as it is agitated thoroughly and rapidly in the mixer. In order to obtain thorough mixing a horseshoe, paddle, or arm mixer is generally employed. Paddle mixers of the type employing intermittent stationary fingers and paddles which scrape or nearly scrape the walls, typically mixers of the type used for making heavy pastes or kneading dough, are preferred. After the clay and pugging agent are thoroughly mixed, the non-anionic surface active agent is added slowly as the mixing continues. In some cases, the clay tends to ball up in the mixer. This ball may be avoided or dispersed by adding a small amount (typically 5% of the clay) of dry material, for example, a powdered weighting material such as 325 mesh shell flour or the like. This step of adding the surface active agent to the clay generally requires several minutes, typically 5 minutes or more, of stirring or pulverization in the mixer. Additional finely divided weighting materials may be added as mixing proceeds if a weighted material is desired or if a particularly dry product is to be prepared for sacking. This mixer leaves the clay in nodules. The nodules are then ground as by passing them through a hammer mill having a fine screen, e. g. 1/16 or 1/8 inch. This pulverized clay is substantially a dry mixture and can be conveniently sacked in paper bags, or the like, for shipment to remote drilling locations, where it is readily dispersed in the oil base.

The effect of varying the ratio of surface active agent to clay within the above specified range at room temperature is shown in the following Table I. In these tests 25 pounds of clay modified with various percentages of a non-anionic surface active agent, Sterox CD, were added to a barrel of 20° API gravity crude oil from the Toborg Field, Crockett County, Texas; and the viscosity, as measured by the Stormer viscosimeter rotating at 600 R. P. M., the fluid loss, as obtained by the standard API procedure described in API Code No. 29, Second Edition, July 1942, and the percentages of solids in the oil base which settled after 48 hours were noted.

TABLE I

| Lbs. Clay per Lb. Surface Active Agent | Viscosity, cps. | Fluid Loss, cc. per 30 Min. | Settling, Percent |
|---|---|---|---|
| 1.0 | 198 | 1.0 | None. |
| 1.5 | 190 | 1.2 | None. |
| 3.6 | 160 | 2.3 | Less than 1. |
| 4.3 | 130 | 2.7 | Less than 1. |
| 5.7 | 122 | 5.0 | 5. |
| 7.0 | 110 | 5.6 | 10. |
| 8.5 | 100 | 6.5 | 20. |

In the preferred range—i. e., in the range of about 3 to about 5 pounds of clay per pound of surface active agent—the viscosity and the fluid loss were quite satisfactory; and the amount of clay which settled out of the solution after 48 hours was also quite satisfactory. At greater concentrations the fluid loss or filtrate rate was considered satisfactory; but, at less than about 1.5% parts clay per part surface active agent by weight (the surface active agent costing some 10 to 20 times the cost of the other constituents), the cost increased out of proportion to the benefits. Obviously, at lower clay concentrations settling approached undesirable proportions. It has been found that desirable results can be obtained—including a low fluid loss, reasonable viscosity, and avoidance of the hazards of working with straight crude—by using a topped crude (a crude in which the most volatile constituents have been removed) alone as the base fluid, or a mixture of refined hydrocarbons and crude oil. For example, crude from which the 200° F. end-point products have been removed produces very desirable viscosity, settling, and fluid-loss characteristics when clay is dispersed therein in accordance with this invention. Combinations of crude oil and topped crude have been found to produce highly desirable oil-base drilling fluid when the clay is dispersed therein according to the above procedure. We have found, for example, that, when 25 pounds of modified clay (4 pounds clay per pound of surface active agent) are dispersed in an oil-base mixture consisting of 60 percent 400 end-point topped crude and 40 percent crude oil (both from the Sholem-Alechem Field, Carter County, Oklahoma), a low fluid-loss is obtained—namely, 2.4 cc. per 30 minutes—and settling of the clay is negligible.

A number of tests were run in which a Wyoming bentonite was treated with 1 part Sterox CD and 1.5 parts of said Toborg crude oil (pugging agent) to 4 parts clay by weight. The results of dispersing various amounts of this modified clay in the same Toborg crude are shown in Table II. In every case, the amount of clay which had settled out of solution (in 48 hours) was negligible.

TABLE II

| Lbs. Modified Clay per Bbls. of Crude | Viscosity, cps. | Fluid Loss cc. per 30 Min. |
|---|---|---|
| 0 | 80 | 3,000 (based on complete loss of 600 cc. of fluid in 6 min.). |
| 10 | 90 | 11.5. |
| 20 | 120 | 2.5. |
| 30 | 140 | 1.9. |
| 50 | 190 | 1.5. |
| 80 | 250+ | 1.0. |

From Table II it is apparent that as the amount of modified clay dispersed in the oil is increased, the viscosity of the drilling fluid is increased and the fluid loss is decreased. On this basis it will be apparent that, within limits of pumpability, the fluid loss can be adjusted to substantially any amount justified economically. However, based upon economic considerations, we have found that between about 20 and about 30 pounds of this modified clay (preferably about 25 pounds) can be dispersed in crude oils of the type tested to obtain the most desirable results at the most economical rate.

We have also found that substantially all weighting materials heretofore employed in either water- or oil-base drilling fluids can be used in oil-base fluid, as described herein; for example, finely divided barytes, oyster shell, limestone, iron oxide, and the like have been suspended satisfactorily in our oil-base drilling fluids. These weighting materials if initially preferentially water wet may as disclosed in the now abandoned copending application S. N. 171,410 filed June 30, 1950, be incorporated in the drilling fluid by being first dispersed in the modified clay as above described. Alternatively, the weighting materials may be separately treated with a non-anionic surface-active agent and then combined with the clay which is already treated as above described. This procedure is preferred in many cases since, apparently due to the difference in surface area of the weighting material and the clay, a smaller amount of surface-active agent is required per unit weight on the weighting material than on the clay. In this modification, between about 2 and about 5 pounds, typically about 3 pounds, of any of the above-described non-anionic surface-active agents may be first pugged onto the weighting material before the weighting material and the clay are mixed, or before they are added to the main body of the organic drilling fluid. In still another alternate procedure, the weighting material, regardless of whether it is preferentially oil wet or preferentially water wet, may be added to the drilling fluid without pretreatment of the weighting material. The weighting material, however, has a greater tendency to settle out of the drilling fluid in this embodiment than in the processes previously described wherein the weighting material is first treated to adsorb a film of surface-active agent before the weighting material is added to the drilling fluid.

As an example of an oil-base drilling fluid produced in accordance with this invention. 1750 pounds of modified clay, prepared by mixing 420 pounds of crude from the Toborg Field, Crockett County, Texas, 1050 pounds of finely divided Wyoming bentonite, and 280 pounds of Sterox CD, were mixed in a ball mill for about one hour. At that time the clay appeared to be dry, with the surface active agent-pugging agent mixture uniformly dispersed on the surface of the particles. This modified clay was then readily dispersed via ordinary hopper and jetting technique in a mixture of 60 bbls. of Toborg crude oil—having a gravity of 20° API at approximately 60° F. and a flash point of 130° F.—and 6 bbls. of No. 2 fuel oil—having a gravity of 35° API and a flash point of 150° F. Weighting material consisting of 4,900 pounds of ground barytes was then added to the drilling fluid as it was stirred vigorously. This drilling fluid had the following properties: viscosity—120 centipoises; API fluid loss—less than 1 cc. per 30 minutes; weight—9.5 pounds per gallon; type of filtrate—oil; flash point—190° F.

In the following tests various common drilling fluid contaminants (salt, water, anhydrite, and cement) were added to an oil-base drilling fluid prepared by dispersing 25 pounds of the above-described modified clay in an oil base consisting of 60% 400 end-point topped crude and 40% crude oil, both from the Sholem-Alechem Field, Carter County, Oklahoma. The results of these tests are given in Table III.

TABLE III

| Contaminant | Contaminant Added, Lbs. per Bbl. | Viscosity, cps. | Fluid Loss, cc./30 Min. |
|---|---|---|---|
| None | | 100 | 2.4 |
| Fresh Water | 40 | 115 | 2.2 |
| Do | 80 | 135 | 1.3 |
| Cement | 5 | 105 | 2.0 |
| Do | 15 | 105 | 2.0 |
| Anhydrite | 5 | 110 | 2.3 |
| Do | 15 | 115 | 1.9 |
| Salt | 25 | 100 | 2.2 |
| Do | 50 | 100 | 1.3 |

In Table IV the properties of various oil-base drilling fluids produced with 300 cc. of base oil and Wyoming bentonitic clays treated with an equal amount, 7 grams, of a number of different non-anionic surface active agents plus 60 grams of 325 mesh shell flour are shown.

TABLE IV

| Surface Active Agent | Pugging Agent | Clay (grams) | Viscosity (cps.) Stormer at 600 R.P.M. | API Fluid Loss, cc./30 min. | Settling 48 hrs. (percent) | Base Oil |
|---|---|---|---|---|---|---|
| Nonionics: | | | | | | |
| Igepal CA Extra | 5 grams Low Viscosity West Texas Crude Oil. | 16 | 180 | 19½ @ 190° F; 4 @ 80° F | 17; 2 | 40% West Texas Crude; 60% Reduced Crude. |
| Nonic 218 | 15 grams Low Viscosity West Texas Crude Oil. | 24½ | 48 | 10 @ 80° F | | West Texas Crude. |
| Renex | 15 grams of 40% Kerosene and 60% Reduced Crude. | 24½ | 250+ | 0 @ 80° F | No settling | 40% Kerosene; 60% Reduced Crude. |
| Cationics: | | | | | | |
| Triton K60 | 5 grams Low Viscosity West Texas Crude Oil. | 24½ | 68 | 8 @ 80° F | 2 | West Texas Crude. |
| Arquad 16 | 5 grams of 40% Kerosene and 60% Reduced Crude. | 16 | 187 | 9½ @ 190° F; 1 @ 80° F | 6.2; 1 | 40% West Texas Crude; 60% Reduced Crude. |

The following Table V illustrates the effect of varying the base oil in a drilling fluid made in accordance with our preferred manufacuring process. In each of these examples, 16 pounds of Wyoming bentonite, 5.6 pounds of 32 API Gravity West Texas crude, 5.6 pounds of Sterox CD, and 52.8 pounds of 325 mesh oyster shell were added to 9 barrels of the various base oils. The physical properties of the drilling fluids produced with the different base oils in API Code 29 units are shown.

TABLE V

| Base Oil | API Gravity, 60° F. | Stormer Viscosity, Cps. | Gel Strength, Grams | | Fluid Loss, cc./30 Min. |
|---|---|---|---|---|---|
| | | | Initial | 10 Min. | |
| Toborg Field Crude, Texas | 19.5 | 185 | 0 | 7 | zero |
| Sour Lake Field Crude, Texas | 19.6 | 190 | 0 | 5 | 1.0 |
| Sholem Alechem Field Crude, Okla | 22.8 | 200 | 0 | 7 | zero |
| Wilmington Field Crude, California | 17.0 | 190 | 0 | 4 | 1.5 |
| 70% Refinery Crude + 30% Fuel Oil | 24.8 | 200 | 0 | 6 | zero |

Thus, it will be apparent that our oil-base drilling fluid, being non-anionic, is not adversely affected by the most common drilling fluid contaminants and that, by using a plastering agent such as clay instead of asphalts, our drilling fluid has very desirable properties which were not achieved prior to our invention. That is, our drilling fluid is less objectionable to drilling crews due to the absence of asphalts; it has highly desirable physical properties; the base oil is readily available in drilling locations; and, due to the nature of the ingredients and the ease of dispersing our modified clays in crude oils, the cost is substantially less than oil-base drilling fluids in general. It will also be apparent that various modifications and combinations of the various ingredients might be compounded by a wide variety of manufacturing processes, without departing from the spirit of this invention. For example, whereas in the preferred embodiment the clay is modified with the non-anionic surface active agent at a central location and this modified clay is then transported to the drilling location where it is dispersed in the base fluid, the drilling fluid can be produced at a central location and shipped, ready for use, in liquid form. Manifestly, the composition of matter is adaptable to a wide variety of uses; and the processes of manufacture, as above described, are capable of modification; and such adaptation and modification as may be construed to fall within the scope and meaning of the appended claims is also considered to be within the spirit and intent of the invention.

We claim:

1. A drilling fluid comprising an oil base, a clay, and a non-anionic surface active agent, said non-anionic surface active agent being adsorbed on said clay while said clay is in an anhydrous state.

2. A composition of matter comprising an oily liquid, a colloidal clay, and a non-anionic surface active agent, a small part of said oily liquid and said surface active agent being adsorbed on said clay while said clay is in an anhydrous state, said surface active agent being present in sufficient amount to disperse substantially all of said clay in said oily liquid, and said clay being present in sufficient amount to impart a gelled structure to and to reduce substantially the filtrate rate of the major part of said oily liquid.

3. A drilling fluid comprising an oil base, a clay, and a non-ionic surface active agent adsorbed on said clay.

4. A modified clay for use in drilling fluids when dispersed in an oil base, comprising finely divided colloidal clay and a non-ionic surface active agent adsorbed thereon.

5. A modified clay for use in drilling fluids when dispersed in an oil base, consisting essentially of finely divided anhydrous colloidal clay wetted by a non-anionic surface active agent and an oily pugging agent.

6. A modified clay for use in drilling fluids when dispersed in an oil base, comprising finely divided colloidal clay and a non-anionic surface active agent, the ratio of said clay to said surface active agent being in the range between about 3:1 to 5:1 (by weight), said surface active agent being adsorbed on said clay while said clay is in an anhydrous state.

7. A modified clay according to claim 6 wherein said surface active agent comprises an ester of tall oil and polyethylene oxide, said ester having about 12 mols of ethylene oxide per mol of tall oil.

8. A method of producing oil-base drilling fluid comprising adsorbing a non-anionic surface active agent on a finely divided anhydrous colloidal clay and then dispersing said clay in an oil base.

9. A method of producing an oil-base drilling fluid comprising the steps of intimately mixing a hydrophilic anhydrous clay and an organic liquid, then intimately mixing said clay while still in an anhydrous state and a substantially oleophilic non-anionic surface active agent to disperse said surface active agent on said clay and then dispersing said clay in an oil-base liquid.

10. A method of producing an oil-base drilling fluid comprising the steps of intimately mixing a hydrophilic anhydrous clay, an organic pugging agent, and an oleophilic non-anionic surface active agent, grinding the nodules of treated clay to produce finely-divided particles of treated clay and then dispersing said treated clay in an oil-base liquid.

11. A method according to claim 10 wherein a finely divided weighting material is mixed with said treated clay before the step of grinding said treated clay.

12. A method according to claim 10 wherein between about 20 and about 30 pounds of said treated clay are dispersed in a barrel of said oil-base liquid.

13. A method of producing a modified clay which swells in an organic liquid comprising adding an oily pugging agent to a finely divided anhydrous colloidal clay, mixing said pugging agent and said clay to disperse said pugging agent on said clay, adding a non-anionic surface active agent to said mixture of pugging agent and anhydrous colloidal clay, mixing said surface active agent, pugging agent, and anhydrous colloidal clay together to disperse said surface active agent on said clay and produce nodules of oil-wetted clay particles, and grinding said nodules to produce finely divided particles which are readily dispersible in said organic liquid.

14. A method of converting hydrophilic clay to a clay which will readily disperse in an oily liquid comprising the steps of intimately mixing 1 part of a liquid non-anionic surface active agent, between about 1.5 and 7 parts of a finely divided hydrophilic anhydrous clay, and between about 0.5 and 3 parts of an organic pugging agent, adding sufficient finely divided inert solids to said mixture during mixing to produce solid nodules in the mixer, and then grinding said nodules.

15. A method according to claim 14 in which said clay and said pugging agent are first intimately mixed and then said surface active agent is added to the mixture.

16. An oil dispersible finely divided clay concentrate comprising by weight 1 part of a non-anionic surface active agent, between about 1.5 and 7 parts of anhydrous colloidal clay, and between about 0.5 and 3 parts of an organic pugging agent.

References Cited in the file of this patent

UNITED STATES PATENTS

| | | |
|---|---|---|
| 2,531,812 | Hauser | Nov. 28, 1950 |
| 2,554,222 | Stross | May 22, 1951 |
| 2,573,650 | Peterson | Oct. 30, 1951 |
| 2,612,471 | Fischer | Sept. 30, 1952 |
| 2,623,852 | Peterson | Dec. 30, 1952 |
| 2,623,853 | Stross | Dec. 30, 1952 |
| 2,675,353 | Dawson | Apr. 13, 1954 |